No. 693,152. Patented Feb. 11, 1902.
J. REIF, Jr.
MACHINE FOR MAKING SLAT AND WIRE FABRIC.
(Application filed Sept. 15, 1899.)
(No Model.) 10 Sheets—Sheet 2.
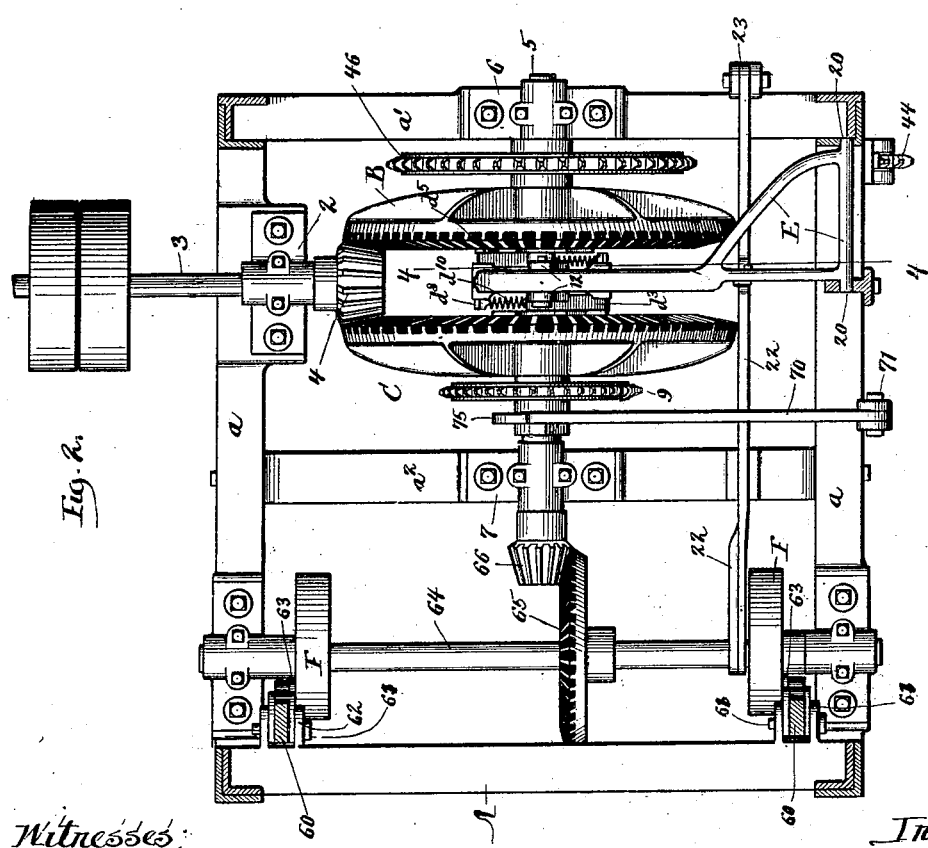

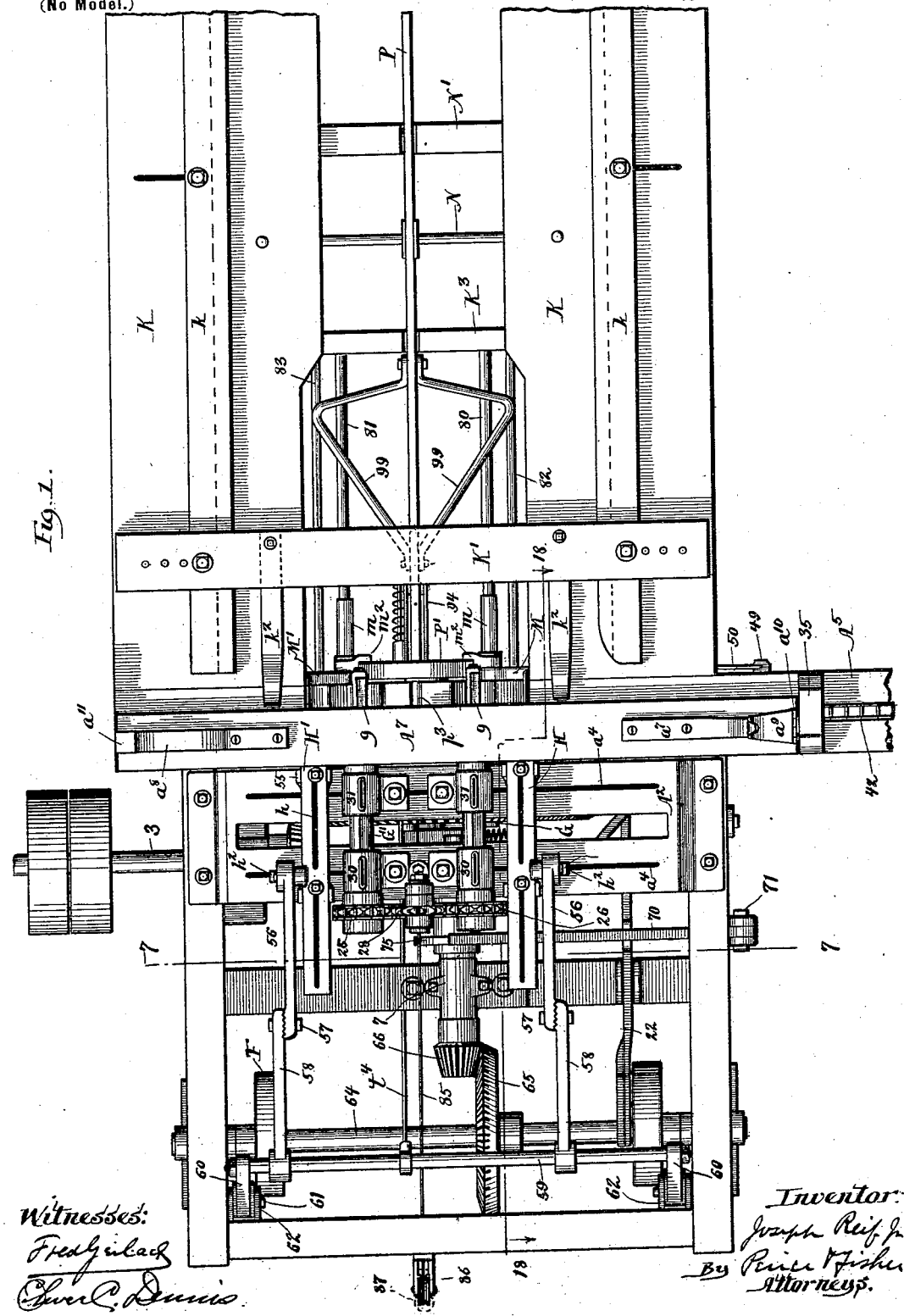

No. 693,152. Patented Feb. 11, 1902.
J. REIF, Jr.
MACHINE FOR MAKING SLAT AND WIRE FABRIC.
(Application filed Sept. 15, 1899.)
(No Model.) 10 Sheets—Sheet 3.
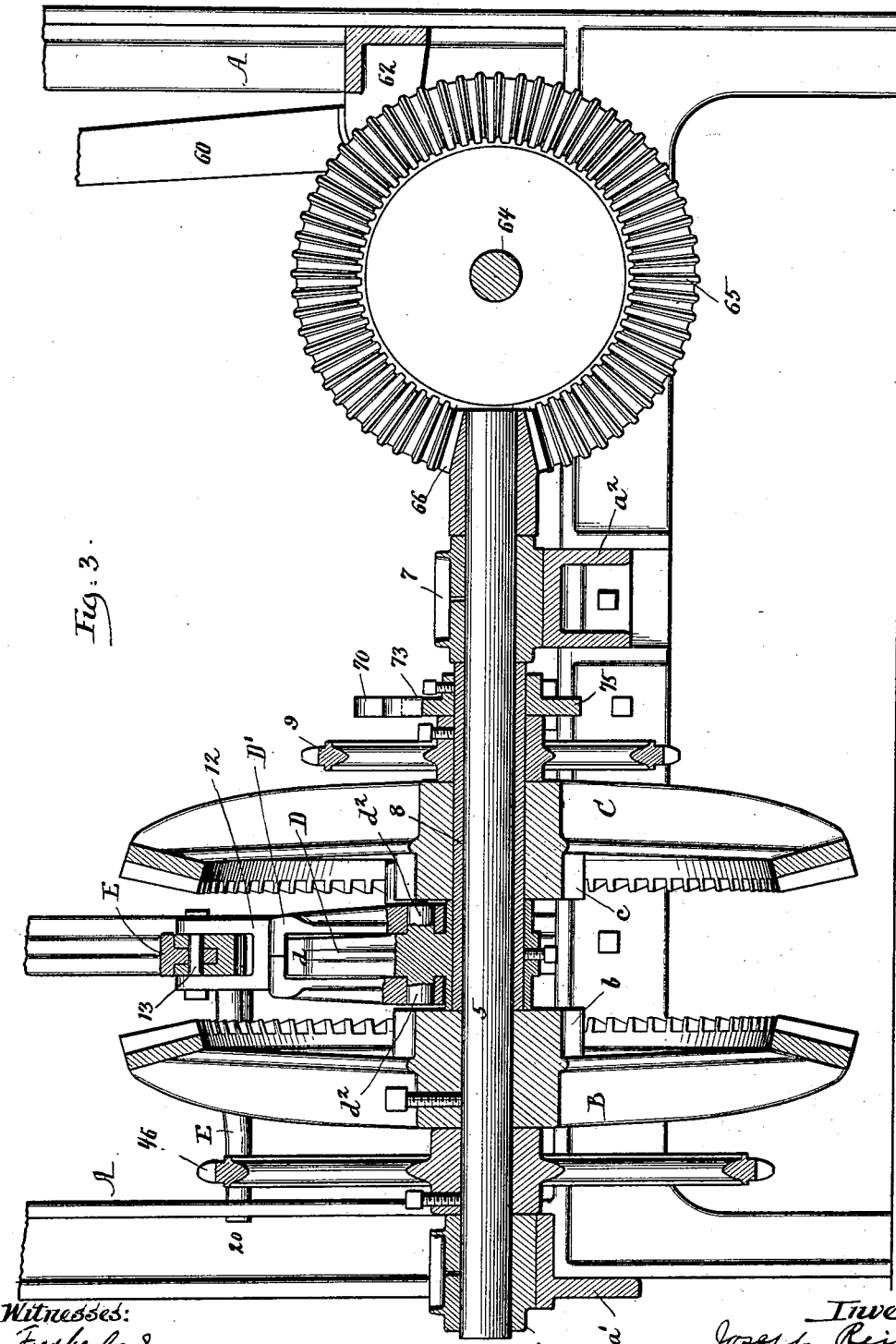

No. 693,152. Patented Feb. 11, 1902.
J. REIF, Jr.
MACHINE FOR MAKING SLAT AND WIRE FABRIC.
(Application filed Sept. 15, 1899.)
(No Model.) 10 Sheets—Sheet 4.
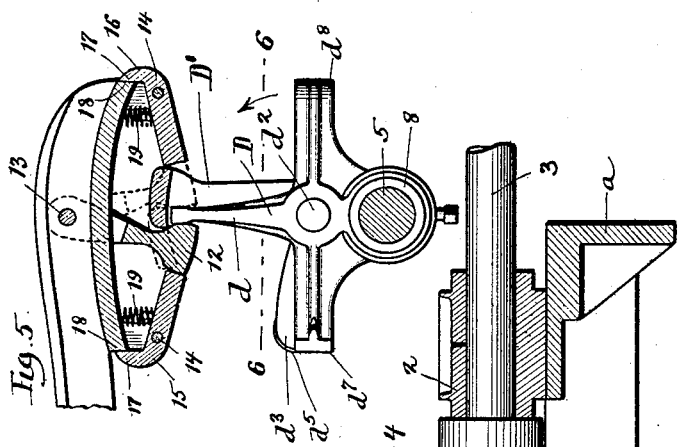
Witnesses:
Inventor:
Joseph Reif Jr
By Perier & Fisher
his Attorneys.

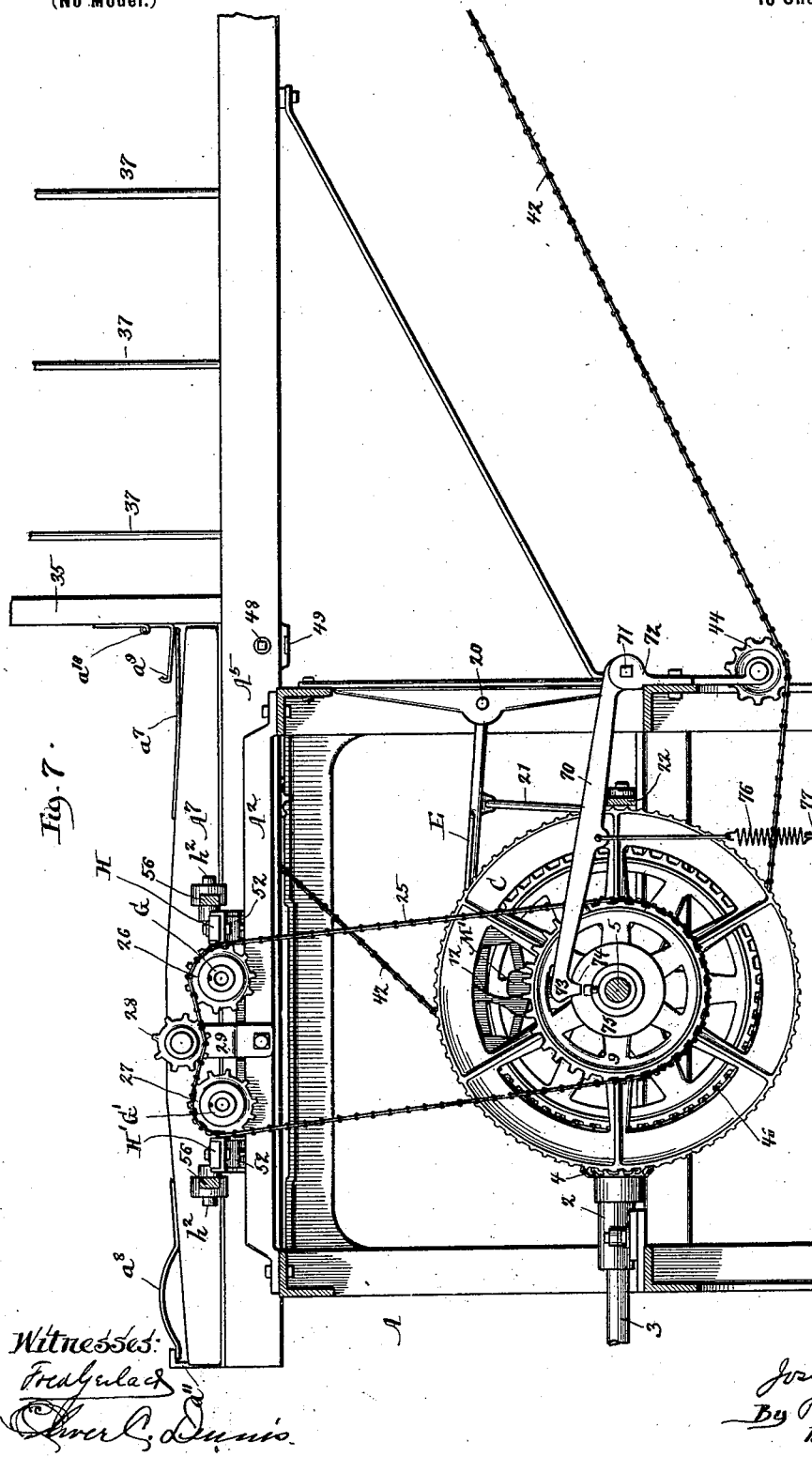

No. 693,152. Patented Feb. 11, 1902.
J. REIF, Jr.
MACHINE FOR MAKING SLAT AND WIRE FABRIC.
(Application filed Sept. 15, 1899.)
(No Model.) 10 Sheets—Sheet 6.
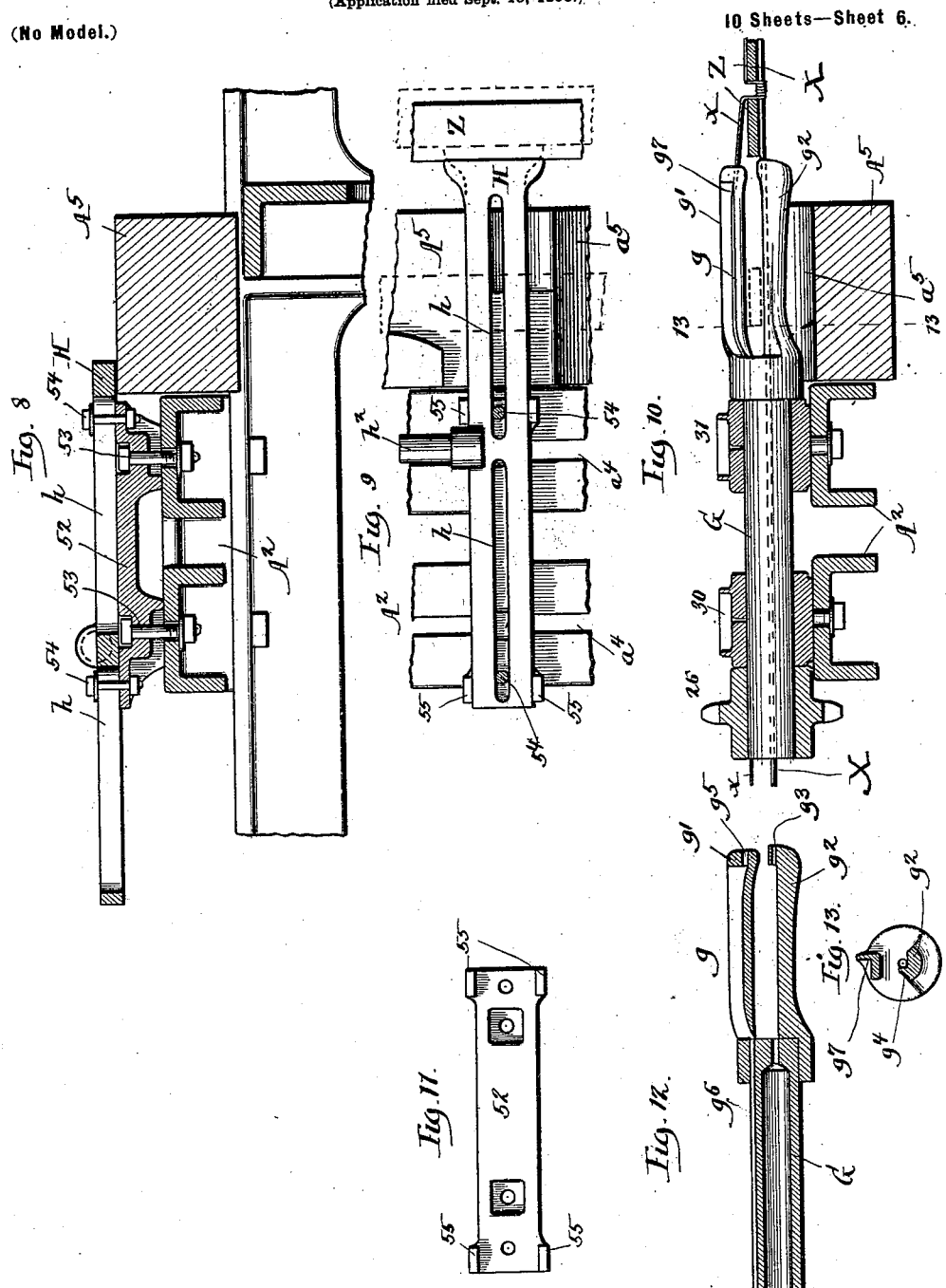

No. 693,152. Patented Feb. 11, 1902.
J. REIF, JR.
MACHINE FOR MAKING SLAT AND WIRE FABRIC.
(Application filed Sept. 15, 1899.)
(No Model.) 10 Sheets—Sheet 7.
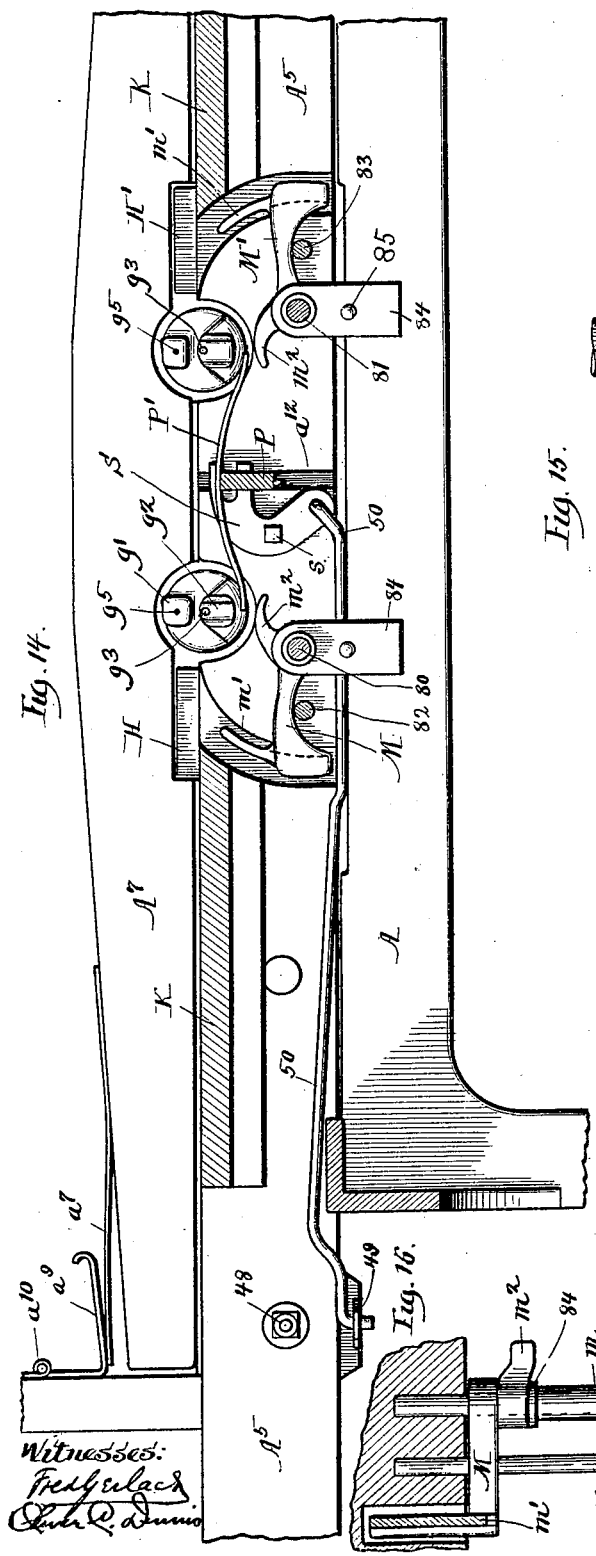
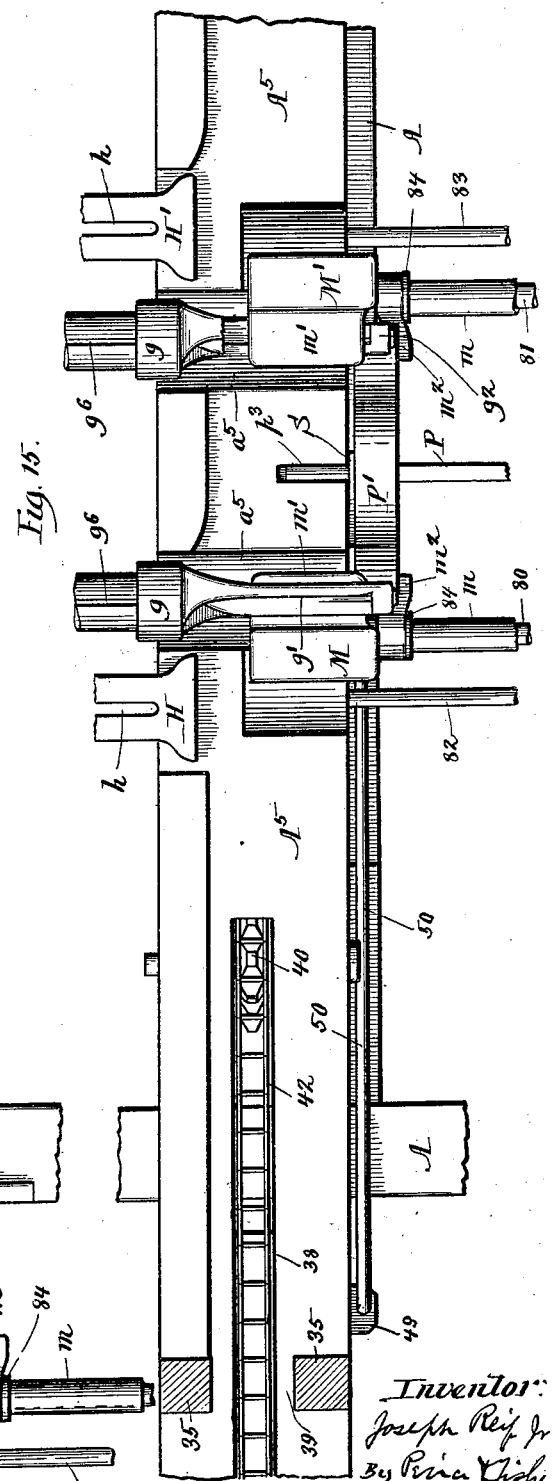

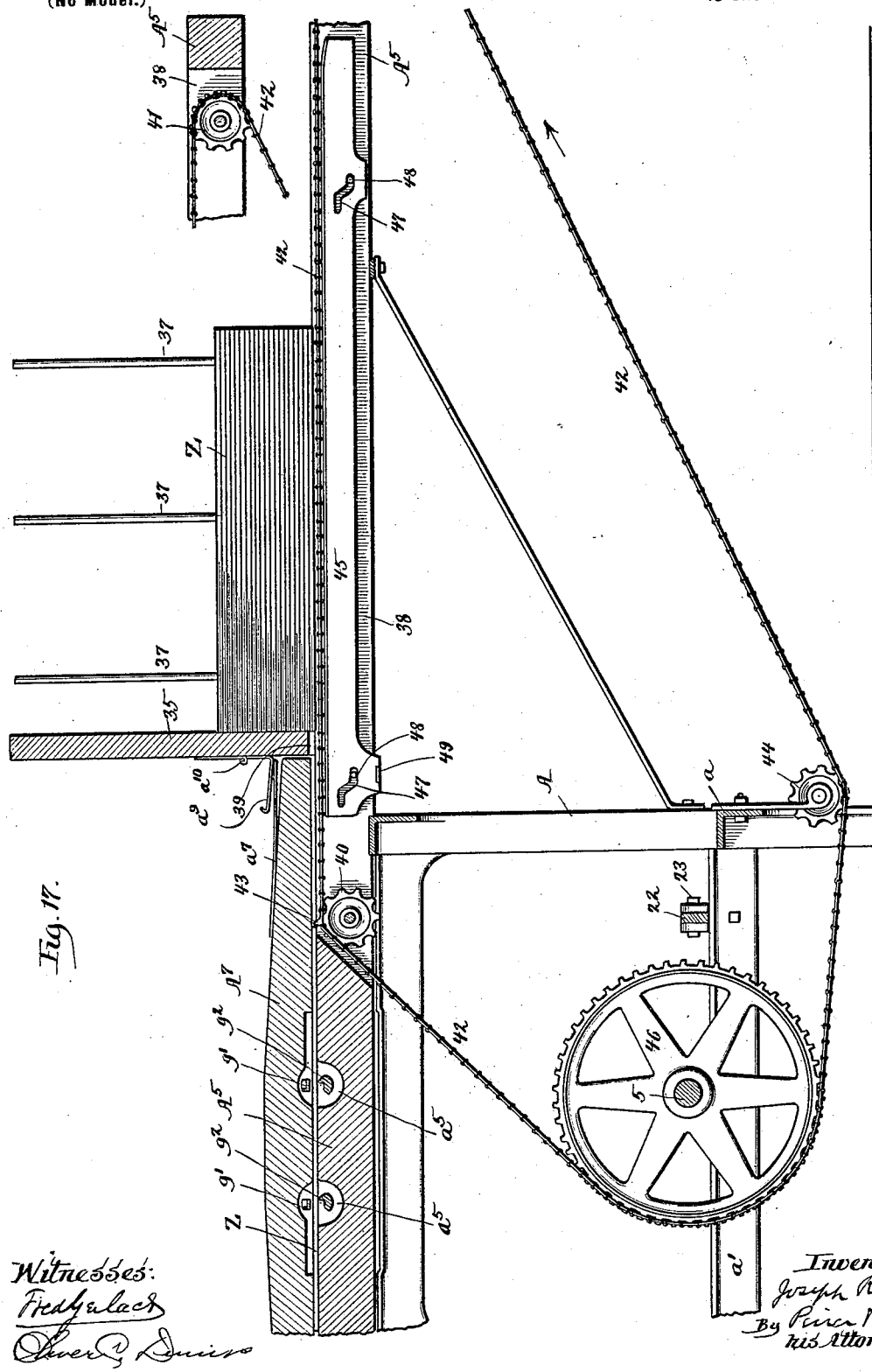

No. 693,152. Patented Feb. 11, 1902.
J. REIF, JR.
MACHINE FOR MAKING SLAT AND WIRE FABRIC.
(Application filed Sept. 15, 1899.)
(No Model.) 10 Sheets—Sheet 9.
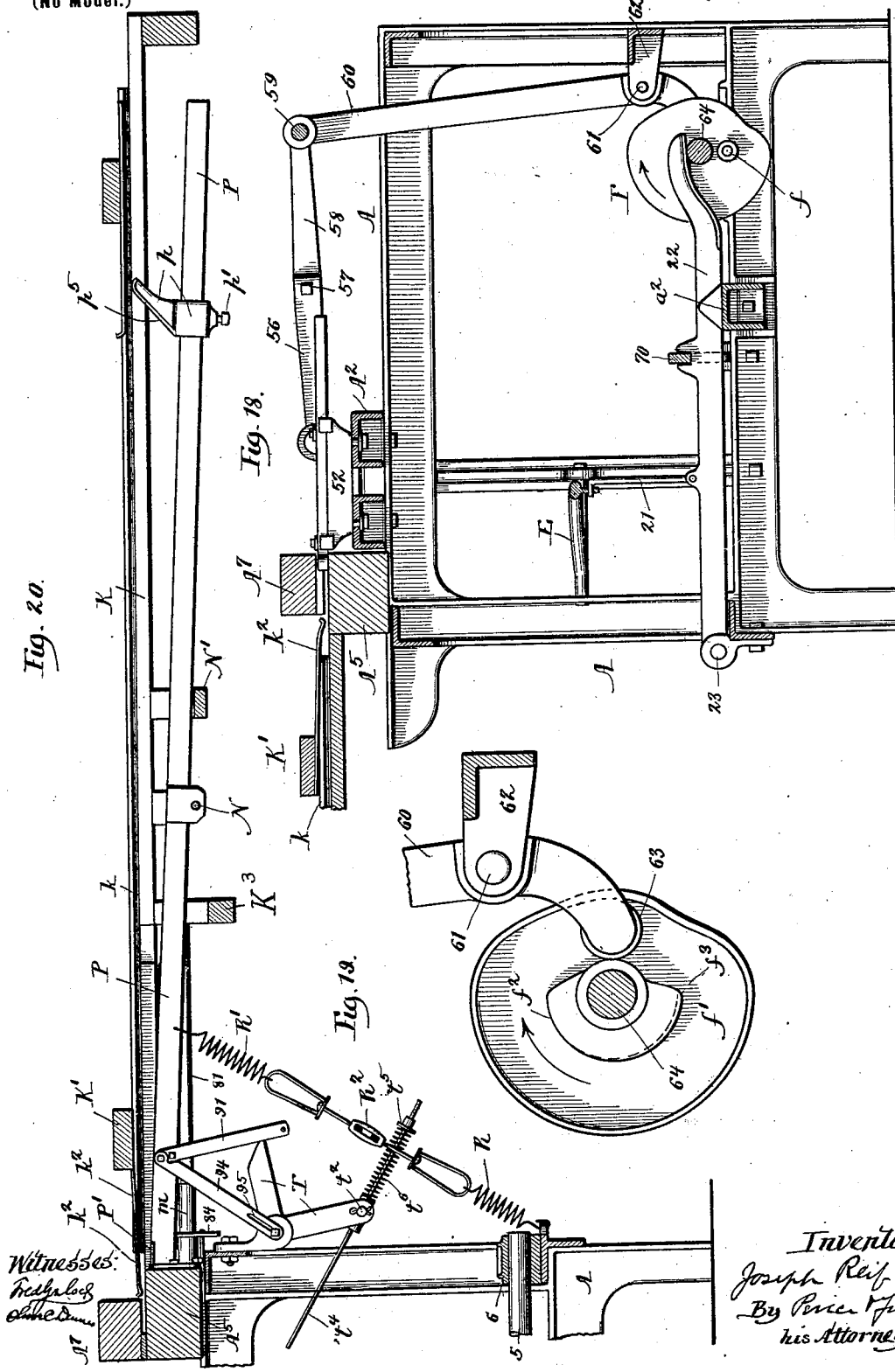
Inventor:
Joseph Reif Jr.
By Price & Fisher
his Attorneys.
Witnesses:

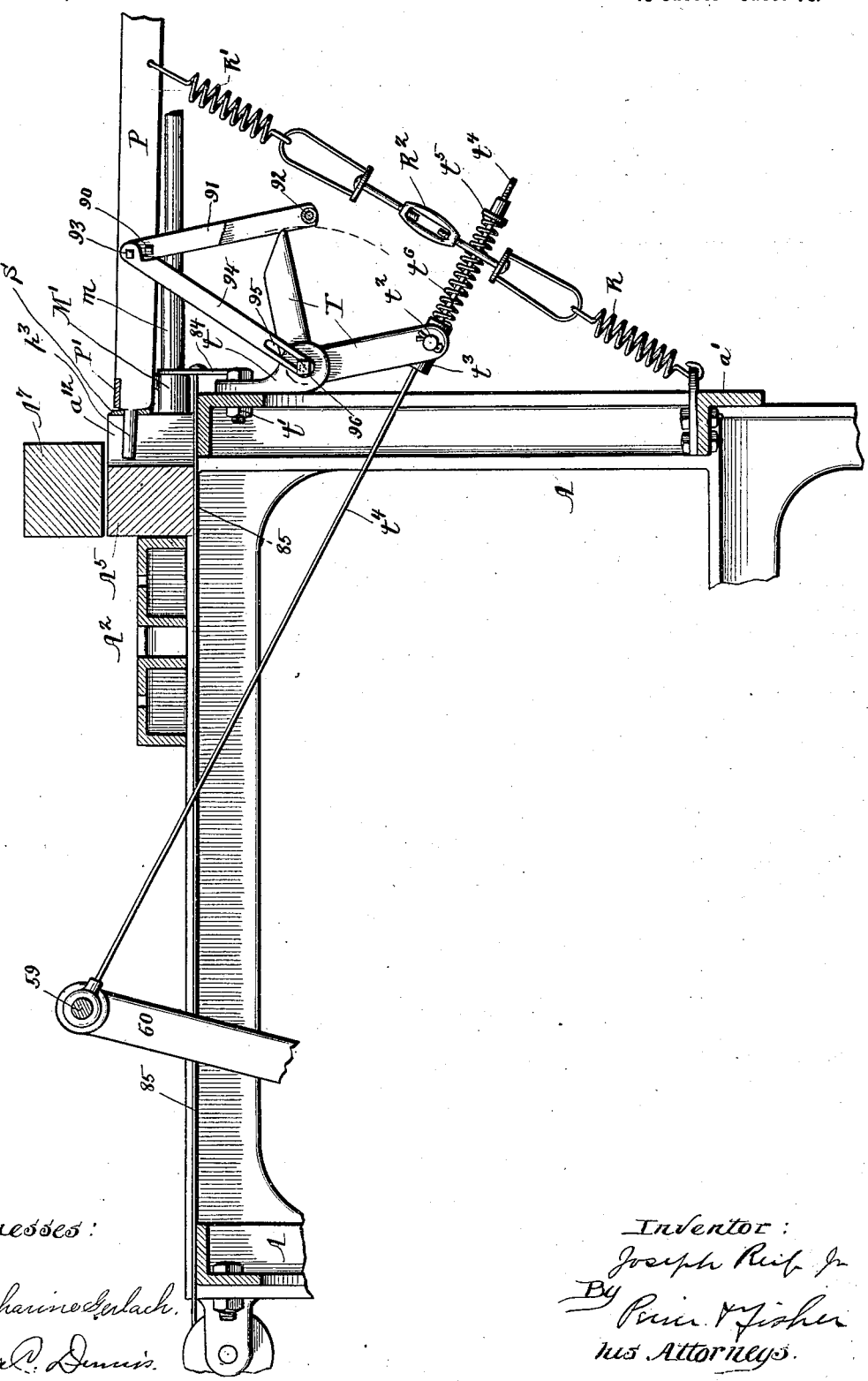

UNITED STATES PATENT OFFICE.

JOSEPH REIF, JR., OF HEBRON, INDIANA, ASSIGNOR TO THE HERCULES WOODENWARE COMPANY, OF CHICAGO, ILLINOIS, A CORPORATION.

MACHINE FOR MAKING SLAT-AND-WIRE FABRIC.

SPECIFICATION forming part of Letters Patent No. 693,152, dated February 11, 1902.

Application filed September 15, 1899. Serial No. 730,553. (No model.)

*To all whom it may concern:*

Be it known that I, JOSEPH REIF, Jr., a resident of Hebron, in the county of Porter, State of Indiana, have invented certain new and useful Improvements in Machines for Making Slat-and-Wire Fabric, of which the following is a full, clear, and exact description, reference being had to the accompanying drawings, forming a part of this specification.

This invention relates to machines designed to form a fabric consisting of slats that are united together by wires, the wires being twisted about each other between the slats. An example of this type of machine is set forth in Letters Patent No. 609,387, granted to the Hercules Woodenware Company, as assignee of Fisher and Reif, August 16, 1898.

The present invention contemplates improved mechanism whereby the alternate turning of the spindles in the opposite directions is effected.

Another feature of this invention is providing the pusher mechanism that laterally advances the slats with suitable means whereby after the slat is presented in front of the spindle a slight gradual additional advance of the slat away from the spindle will be effected during the turning of the spindles in order to prevent the coils of the tie-wire from overlapping each other.

A further object of this invention is to provide improved mechanism for spacing the mat or length of fabric as it issues from the machine in order to enable it to be readily and accurately severed into uniform pieces or sections.

The invention consists also in various other features of improvement, all of which will be hereinafter described, and particularly pointed out in the claims.

Figure 1 is a plan view of the machine embodying the invention. Fig. 2 is a plan view of the gear mechanism beneath the top of the main frame, the corner-posts of the main frame being shown in section. Fig. 3 is an enlarged detail view in vertical longitudinal section through the reversing-gear mechanism and adjacent parts. Fig. 4 is an enlarged detail view in vertical cross-section on line 4 4 of Fig. 2. Fig. 5 is a detail view in vertical section through the clutch mechanism. Fig. 6 is a detail view in horizontal section on line 6 6 of Fig. 5, portions of the clutch-wheels and certain other parts being also shown. Fig. 7 is a view in vertical section on line 7 7 of Fig. 1. Fig. 8 is a detail view in vertical longitudinal section through one of the slatted pushers and its supporting parts. Fig. 9 is a plan view of the part shown in Fig. 8. Fig. 10 is a detail view in vertical section through the bearings of one of the spindles, the spindle being shown in elevation. Fig. 11 is a detail plan view of a supporting-plate for one of the pushers. Fig. 12 is a detail view in vertical longitudinal section through one of the spindles. Fig. 13 is a view in cross-section through the projecting arm of one of the spindles. Fig. 14 is a detail front view of the ends of the spindles and the dummy mechanism adjacent thereto, parts being shown in vertical section. Fig. 15 is a plan view of the mechanism shown in Fig. 14. Fig. 16 is a detail view in horizontal section through the arm or plate of one of the dummies, the means for supporting the dummy being also shown. Fig. 17 is a view in vertical cross-section through a part of the main frame, through the arms of the spindles, and through the feed-table and presser-bar for the slats, the mechanism for feeding the slats to the spindles being shown in elevation. Fig. 18 is a view in vertical longitudinal section on line 18 18 of Fig. 1, parts being omitted. Fig. 19 is an enlarged detail view showing one of the cam-wheels and one of the driving-arms engaging therewith. Fig. 20 is a view in vertical section through the rear end of the main frame and through the work-table, the dummy mechanism beneath the work-table being shown in side elevation. Fig. 21 is an enlarged view similar to Fig. 20, but showing more of the main frame and the means whereby the dummy mechanism is actuated.

The frame A of the machine is preferably a cast-metal frame of substantially the same construction as in the Fisher and Reif patent above mentioned. Upon one of the side bars *a* of the main frame is shown one of the bearings 2 of the main drive-shaft 3, this shaft being shown with the usual tight and loose pulleys to receive the drive-belt. The shaft 3 (see Figs. 1, 2, and 7) carries at its inner end a bevel-pinion 4, that meshes with the bevel gear-wheels B and C and serves to rotate these gear-wheels continuously in opposite directions. The gear-wheel B is fixed by a set-screw (see Fig. 3) to the gearing-shaft 5, that is journaled in bearings 6 and 7, supported upon the cross-bars $a'$ and $a^2$ of the main frame. The gear-wheel C is also supported by the shaft 5, but is keyed to the long sleeve 8, that is revolubly sustained upon the shaft 5. Upon the sleeve 8 is also keyed a sprocket-wheel 9, whereby the wire-twisting spindles will be driven alternately in opposite direction, as will presently more fully appear.

The gear-wheels B and C are provided, respectively, with the clutch-wheels $b$ and $c$, these clutch-wheels serving to effect the engagement of either of the wheels B or C with the sleeve 8 in order to effect the revolution of the drive sprocket-wheel 9 in the corresponding direction—that is to say, when the clutch-wheel $b$ of the gear-wheel B is brought into engagement (by mechanism to be presently described) with the sleeve 8 the sprocket-wheel 9 will be driven in one direction—whereas when the clutch-wheel $c$ of the gear-wheel C is connected with the sleeve 8 the direction of revolution imparted to the sleeve and to the sprocket-wheel 9 will be the reverse, and consequently the driving of the spindles in opposite direction will be effected, as will presently more fully appear. The preferred mechanism for effecting the alternate connection of the gear-wheels B and C with the driving sprocket-wheel 9 is shown in the accompanying drawings. (See Figs. 2 to 6.) Upon the sleeve 8 is keyed the hub of the clutch D. This clutch comprises a projecting arm $d$ and a yoke-shaped bracket D', that is pivoted upon the trunnions $d^2$, (see Fig. 3,) the bracket D' being furnished with clutch-arms $d^3$ and $d^4$, carrying rollers $d^5$, and from the projecting arm or standard $d$ extend the arms $d^7$ and $d^8$. Between the angular end of each of the arms $d^7$ and $d^8$ and a projection $d^9$, formed adjacent the pivot-point of each of the clutch-arms $d^3$ and $d^4$, is interposed a coiled spring $d^{10}$, the purpose of which will hereinafter appear. When the roller $d^5$ of the clutch-arm $d^3$ is in engagement with the clutch-wheel $b$ of the gear-wheel B, it is obvious that revolution will be imparted by the gear-wheel B to the clutch D and through this clutch to the sleeve 8 and to the driving sprocket-wheel 9, whereby the wire-twisting spindles are operated. If, however, the clutch-arm $d^3$ is disengaged from the clutch-wheel $b$ and the roller $d^5$ of the clutch-arm $d^4$ is thrown into engagement with the clutch-wheel $c$ of the gear-wheel C, then it is obvious that the clutch will be caused to revolve in the opposite direction, and hence through the medium of the sleeve 8 will impart revolution in the opposite direction to the driving sprocket-wheel 9, whereby the wire-twisting spindles are driven. It will also be seen by reference more particularly to Fig. 4 of the drawings that when the rollers $d^5$ of both of the clutch-arms $d^3$ and $d^4$ are disengaged from the clutch-wheels $b$ and $c$ then revolution will not be imparted to the sleeve 8 nor to the driving sprocket-wheel 9, and consequently at such time the wire-twisting spindles will be held against revolution.

The mechanism that I prefer to employ for effecting the disengagement of the clutch-arms from the clutch-wheels $b$ and $c$ of the gear-wheels B and C, in order that the wire-twisting spindles may remain stationary while the slats are being fed between the wires carried by said spindles, is preferably that more particularly illustrated in Figs. 4, 5, and 6 of the drawings. At the inner end of an arm E is carried latch mechanism for disengaging the clutch. This latch mechanism, as shown, comprises a depending dog 12, pivoted, as at 13, to the arm E, the upper end of the dog 12 being shown as bifurcated to straddle the arm E. At opposite sides of the dog 12 and pivoted, as at 14, to depending portions of the arm E are the catches 15 and 16, the upper ends 17 of which are held normally in engagement with shoulders 18, formed on the depending portion of the arm E by means of coiled springs 19, that are interposed between the catches 15 and 16 and the arm E. The latch-arm E is adapted to be automatically raised and lowered, so as to cause the mechanism carried thereby to engage and arrest the clutch-arms at the proper time for stopping the revolution of the wire-twisting spindles. As shown, the arm E is pivoted to the main frame, as at 20, (see Fig. 2,) and the arm E is connected by a link 21 to a bar 22, by which the arm E will be raised and lowered. The bar 22 is pivoted, as at 23, to the main frame, (see Fig. 2,) and the free end of this bar 22 extends to a point adjacent a cam-wheel F. A lateral projection $f$ on the cam-wheel F contacts with the under side of the arm and periodically raises this arm 22, so as to cause a corresponding rise and fall of the latch-arm E and the parts carried thereby. From the foregoing description it will be understood that when the arm E is in its raised position the dog 12 will be above the path of rotation of the bracket D' of the clutch mechanism. When, however, the latch-arm E is lowered, the dog 12 and the catches 15 and 16 will pass into the path of revolution of the clutch-bracket D' and the arm $d$ within such bracket. Thus, for example, if it be assumed that the clutch D has been revolving in the direction of the arrow, Fig. 5, with the roller $d^5$ of the clutch-arm $d^3$ in engagement with the clutch-wheel $b$ of the gear-wheel B, and the arm E is automatically lowered, as will presently appear, the outer end of the bracket D' will contact with the inner end of the catch 16, thereby lifting this catch and passing into engagement with the depending dog 12, which is promptly pushed against the inner end of the opposite catch 15. At the same time the inner end of the catch 16 springs behind the bracket D' and locks the bracket against movement, as clearly shown in Figs. 4 and 5 of the drawings. It is obvious that this engagement of the bracket D' and arm $d$ of the clutch with the latch mechanism will cause the arm $d^3$ to be rocked, so as to throw its roller $d^5$ out of engagement with the clutch-wheel $b$ of the gear-wheel B. By reference to Fig. 5 it will be seen that the head or upper end of the bracket D' is considerably broader than the upper end of the arm $d$. Consequently after the bracket D' contacts with the dog 12 the arm $d$ still moves slightly until it also contacts with the dog 12. This movement of the arm $d$ causes the point $d^9$ at the hub of the bracket D' (see Fig. 4) to move out of the plane of the corresponding angular end of the arm $d^7$. Hence the spring $d^{10}$ will be thrown off center and will tend to further revolve the bracket D' in a direction opposite to that shown by the arrow in Fig. 5. Consequently when the latch-arm E is raised so as to release the clutch-bracket D' the spring $d^{10}$ will promptly shift the clutch-bracket so as to throw the roller $d^5$ of the clutch-arm $d^4$ into engagement with the clutch-wheel $c$ of the gear-wheel C. The clutch being thus thrown into engagement with the gear-wheel C will be given the direction of revolution opposite to that which it received when in engagement with the gear-wheel B, and inasmuch as the clutch is connected to the sleeve 8, that carries the driving sprocket-wheel 9, it will be understood that a corresponding opposite direction of revolution will be imparted to the wire-twisting spindles, that are driven by said sprocket-wheel 9. It will be understood, of course, that when the latch-arm E is again lowered to release the clutch, effecting the stopping of the wire-twisting spindles, the bracket D' and arm $d$ of the clutch, inasmuch as they are traveling in a direction opposite to that shown by the arrow, Fig. 5, strike the inner end of the catch 15 and contact with the adjacent side of the depending dog 12, thus causing this dog to assume the position shown by dotted lines in Fig. 5.

From the sprocket-wheel 9 leads a sprocket-chain 25, that passes around sprocket-wheels 26 and 27, keyed to the ends of the spindles G and G', and beneath the idler sprocket-wheel 28, that is carried by the bracket 29, (see Fig. 7,) bolted to the top plate $A^2$ of the main frame. It is manifest that any desired number of wire-twisting spindles may be used; but two are shown in the drawings. The spindles G and G' are mounted in bearing-boxes 30 and 31 on the top plate $A^2$, (see Fig. 1,) these bearing-boxes being shown as held in place by through-bolts, that pass through slots $a^4$ of the top plate to permit the lateral adjustment of the bearing-boxes and spindles, if desired. Each of the spindles G and G' is provided with a spindle-head $g$, and each of these spindle-heads is shown as comprising upper and lower projecting arms $g'$ and $g^2$, (see Figs. 10 and 12 to 15,) that are separated a sufficient distance to permit the passage of the slats between said arms when the spindles are in the position of rest, as shown in Fig. 10. The spindle-heads $g$ pass through the feed-table $A^5$, that is formed with the recesses $a^5$ for this purpose, the upper face of the feed-table being substantially in line with or slightly above the plane of the lower arms $g^2$ of the spindles. Each of the spindles G G' is hollow from end to end or formed with a suitable channel to permit the passage therethrough of the main binding-wire X, and the lower arm $g^2$ of each spindle is formed with an eye $g^3$ at its outer end, through which the binding-wire X also passes. As shown, the lower arm $g^2$ of each of the spindles is formed adjacent the side at which the slats are delivered with a raised rib $g^4$ (see Fig. 13) to prevent the slats from striking the binding-wire as the slats pass between the arms of the spindles. Manifestly a groove formed lengthwise of the upper surface of the lower spindle-arm $g^2$ will answer the same purpose. The upper arm $g'$ is formed with an eye $g^5$, through which will pass the tie-wire $x$, that is conducted over the top of the arm $g'$, and through a longitudinal groove $g^6$, formed in the periphery of the spindle. The top of each of the upper arms $g'$ is shown as provided with a depressed portion $g^7$, within which the binding-wire will lie. (See Figs. 10 and 13.) The feed-table $A^5$ extends across the top of the main frame, (see Figs. 1, 7, and 14,) that is conveniently bolted thereto, and over the feed-table extends a presser-bar $A^7$, that is yieldingly forced toward the feed-table by springs $a^7$ and $a^8$, attached to its upper face. The spring $a^7$ engages with a latch $a^9$, that is pivoted, as at $a^{10}$, to the front plate 35 of a slat-holding rack or hopper, (see Figs. 7 and 17,) while the spring $a^8$ has its free end engaged by a lug or bracket $a^{11}$, that rises from the outer end of the feed-table. When the presser-bar $A^7$ is to be removed, the latch $a^9$ will be swung upward, after which the bar may be lifted, so as to disengage the spring $a^8$ from the lug or bracket $a^{11}$. The under side of the presser-bar $A^7$ is recessed (see Fig. 14) to admit the spindle-heads and to admit the slat-pushers; but between the spindle-heads and at each side of the slat-pushers the under surface of the presser-bar is in sufficiently close proximity to the surface of the feed-table $A^5$ to coöperate with the table in accurately delivering the slats between the arms or jaws of the spindles or wire-twisters G G'. The feature of providing the feed-table with a raised surface between the twister-heads or spindles is of advantage in insuring the delivery of the slats, particularly where the ends of the slats are at all warped or twisted. By reference more particularly to Figs. 10 and 12 of the drawings it will be seen that the upper arm $g'$ is a trifle shorter than the lower arm $g^2$, as I have found in practice that by this arrangement a more effective laying of the tie-wire $x$ around the binding-wire $X$ can be secured.

The feed-table $A^5$ (see Figs. 1, 7, 15, and 17) extends outwardly at one side of the main frame and serves to support the mass of slats Z, that are to be held together by the binding and tie wires X and $x$, and in order to retain the slats in vertical position the side rods 37 are employed, these side rods rising at each side of the feed-table and constituting with the extended part of this table a suitable rack or hopper. Manifestly, however, it is not essential that the bottom of the rack or hopper should be formed integral with the feed-table, this being merely a matter of convenience. The feed-table $A^5$ is formed with a long slot or channel 38, at the opposite ends of which are journaled the sprocket-wheels 40 and 41, (see Fig. 17,) over which sprocket-wheels and beneath a tightener sprocket-wheel 44 passes a sprocket-chain 42, that is provided with a feed-dog 43. This feed-dog may consist simply of a sprocket-link having an upward extension of sufficient height to engage the end of the lowermost slat Z within the hopper, and the bottom of the front plate 35 of the hopper is cut away, as at 39, to permit the lowermost slat to be carried by the feed-dog 43 from the hopper and delivered between the feed-table $A^5$ and presser-bar $A^7$. In the slot or channel 38 beneath the slat-holding hopper is mounted a vertically-movable support 45, over which the sprocket-chain 42 passes, this support serving normally to hold the sprocket-chain in such position that the dog 43 shall engage the lowermost slat Z within the hopper; but when the support 45 is lowered the dog 43 will travel beneath, and consequently will not feed out the lowermost slat. In other words, the table or support 45 serves to throw the slat-feeding mechanism temporarily out of action. Sprocket-chain 42 is constantly driven by a sprocket-wheel 46, that is keyed to the gear-shaft 5, and it will be understood, of course, that the size of the sprocket-wheel 46 and the length of the chain 42 will be such as to insure the delivery of a slat Z from the hopper each time that the wire-twisters or spindles G G' have been arrested with their arms in position shown in Fig. 10, except when the slat-feeding mechanism is thrown out of action. In order to effect the raising and lowering of the support 45, I prefer to form the support with cam-shaped slots 47, (see Fig. 17,) through which pass the pins 48, that are embedded in the table $A^5$, and to the lower edge of the support 45 is connected a bar 49, (see Figs. 14 and 15,) to which bar is attached a link 50, whereby the support 45 will be shifted back and forth in the direction of its length by mechanism to be presently described. By reference to Fig. 17 of the drawings it will be seen that as the support 45 is shifted backward from the position shown it will ride downward upon the pins 48 and will permit the sprocket-chain 42 to travel at such distance below the slats Z within the hopper that the dog 43 will not engage or feed forward such slats. By reference to Figs. 10 and 17 of the drawings it will be seen that the slats Z are delivered between the arms of the wire-twisters G G'; but manifestly the slats must be moved laterally and beyond the arms of the twisters before the twisters can be permitted to revolve. In order to effect the lateral advance or feed of the slats after they have been delivered between the arms of the wire-twisters, I prefer to employ the mechanism next to be described, reference being had more particularly to Figs. 1, 2, 8, 9, 15, 18, and 19 of the drawings.

Upon the top plate $A^2$ of the main frame are mounted the slat-pushers H and H', that are preferably supported by plates 52, that are connected by bolts 53 (see Fig. 8) to the top plate $A^2$. As shown, each of the pushers H and H' is formed with slots $h$, through which pass the bolts 54, that hold the pushers in place, the lateral edges of the pushers being guided by the flanges 55, that rise from the supports 52 at each side of the pushers H H'. Each of the pushers H H' is shown as provided with a lateral-projecting stud $h^2$, (see Fig. 9,) to which is pivotally connected one end of a link 56, the opposite end of this link being connected by a bolt 57 to a link 58, that has its forward end mounted upon a cross-rod 59, that unites the upper ends of the pusher-levers 60. By reference more particularly to Fig. 1 it will be seen that the adjoining faces of the links 56 and 58 are serrated, and one of the slots through which the bolt 57 passes will be elongated, so that the links 56 and 58 may be adjusted in order to vary their effective length. The purpose of this construction is to enable the exact extent of movement of the pushers H H' to be accurately determined. The pusher-levers 60 are journaled, as at 61, in brackets 62, projecting inwardly from the main frame, (see Figs. 1, 18, and 19,) and the lower end of each of the pusher-levers 60 (if two pusher-levers be used) is provided with a laterally-projecting stud, preferably carrying a friction-roll 63, that enters a camway $f'$ of the cam-wheel F. Each of the cam-wheels F is keyed to a transverse shaft 64, the ends of which are journaled in the main frame, and continuous rotation is imparted to this shaft 64 by a beveled gear-wheel 65, that engages a beveled gear-pinion 66, mounted upon the end of the main gear-shaft 5. (See Figs. 1 and 3.) The shape of the camway $f'$ of each of the cam-wheels F is such that the pusher-levers 60 are not only rocked back and forth in order to cause the pushers H H' to properly feed the slats Z out from between the jaws or arms of the wire-twisters, but the camways $f'$ are also so shaped that when the pusher-levers are in their retracted position they will be delayed or held in such position during the time that the feed mechanism is advancing the lowermost slat from the feed-hopper and between the arms or jaws of the wire-twisters. Preferably the camways $f'$ are so shaped that after the slats have been advanced from between the jaws of the wire-twisters and in position to be wrapped by the wires a further slight advance of the slats will occur in order to prevent the overlapping of the coils of the tie-wires during the twisting operation.

From the construction of parts as thus far defined it will be seen that if a pile of slats Z be placed within the feed-hopper, as shown in Fig. 17, and the machine be started the operation will be as follows, it being assumed that at the outset the wire-twisters G and G' have their arms or jaws in vertical alinement in position to receive a slat, as shown in Fig. 17 of the drawings. It will be understood also that at such time the pushers H and H' will be in retracted position (seen in Fig. 1) and that the feed-dog 43 of the sprocket-chain 42 will be outside the pile of slats Z. The movement of the sprocket-chain 42 will first cause the feed-dog 43 to engage the outer end of the lowermost slat Z and carry this slat from the hopper into the space between the feed-table $A^5$ and presser-bar $A^7$ and between the jaws or arms of the wire-twisters until the slat reaches the position seen in Fig. 17 of the drawings, when the feed-dog 43 will pass from engagement with the slat. The cams F will then act upon the pusher-levers 60 and cause these levers to advance the pushers H H', so as to move the slat Z laterally from between the jaws or arms of the wire-twisters, the movement of the slat Z being from the position shown by dotted lines to the position shown by full lines in Fig. 10 of the drawings. At the time that the pushers H and H' are advanced to move the slat Z from position shown by dotted lines to position shown by full lines in Fig. 10 that portion of the camway $f'$ designated as $f^2$ will have engaged the friction-roll 63 at the lower ends of the pusher-levers; but during this time the clutch mechanism whereby the wire-twisters are driven will be out of action, because the latch-bar E will be in the depressed position shown in Figs. 4 and 5 of the drawings. When the slat has been advanced by the pushers to the position shown by full lines in Fig. 10, the stud or projection $f$ on one of the cam-wheels F will engage the under side of the lever 22, (see Fig. 18,) thereby lifting this lever and causing it in turn, through the connections described, to raise the latch-bar E and release the clutch, so as to permit the clutch to effect the engagement of one of the gear-wheels B—for example, with the sleeve 8—(see Fig. 3,) to which is connected the driving sprocket-wheel 9, whereby the wire-twister spindles are driven. The wire-twisters will then be revolved, causing the tie-wire $x$ to be wrapped around the binding-wire X, as shown in Fig. 10 of the drawings. During the time that the tie-wire $x$ is thus being wrapped around the binding-wire X the rollers 63 of the pusher-levers 60 (see Fig. 19) will be passing over that part of the camway $f'$ from the point $f^2$ to the shoulder $f^3$. This part of the camway between the points $f^2$ and $f^3$ is slightly eccentric, as indicated by the concentric dotted line in Fig. 19. Consequently the pushers instead of remaining idle during the time that the wire-twisters are revolving will be advanced gradually and slightly from the position shown by full lines in Fig. 9 to the position shown in dotted lines in said figure, and this advance will be just sufficient to prevent the coils of the tie-wire $x$ from overlapping one another as the tie-wire is wrapped around the binding-wire. As soon as the desired number of wraps or coils of the tie-wire $x$ around the binding-wire has been effected the pushers H H' will be retracted to the position shown in Figs. 1 and 8; but before the retraction of the pushers H H' begins the projection $f$, Fig. 18, will have passed from engagement with the lever 22, allowing this lever to descend to position shown in Fig. 18, and thereby causing the latch-bar to throw the clutch mechanism out of action, as shown in Figs. 4 and 5. It is desirable to have the sprocket feed-chain 42 travel rapidly, so as to quickly feed the slats in front of the spindles; but in order that the dog 43 shall feed a slat only at the proper time the chain 42 is made of considerable length, the feed-table being extended laterally beyond the slat-hopper for this purpose, as shown in Fig. 17. After the pushers H H' have been retracted and another slat has been fed between the arms or jaws $g'$ and $g^2$ of the wire-twisters the projection $f$ on the cam-wheel F (see Fig. 18) will again lift the lever 22 and raise the latch-bar E, Figs. 4 and 5, so as to permit the clutch to be thrown into engagement with the clutch-wheel $c$ of the other gear-wheel C, and thus effect the turning of the spindles or wire-twisters G G' in opposite direction. It will thus be seen that the wire-twisters G G' alternately revolve in opposite directions, the advantage of this operation being that the binding-wire X and tie-wire $x$ can be taken from the merchant-coils located upon suitable spools (not shown) at the front of the machine.

In order to hold the parts against accidental movement by the wire-twister spindles G and G', I have provided stop mechanism comprising a lever 70, (see Figs. 1, 2, 3, and 7,) that is pivoted, as at 71, to a bracket 72, bolted to the main frame, this lever 70 having its inner end provided with a downward extension 73, adapted to engage a notch or recess 74, formed in the periphery of a wheel 75, that is fixed to the sleeve 8, that encircles the main gear of the shaft 5. A coiled spring 76, that is connected with the lever 70 and with the fixed bolt 77, serves to draw the lever 70 normally downward. The lever 70 extends across and rests upon the lever 22, whereby the latch-bar E is operated to throw the clutch into and out of engagement, and it will therefore be seen that when the lever 22 is lowered, as hereinbefore described, to throw the clutch mechanism out of action the lever 70 will also be drawn downward, so that its offset end 73 will enter the notch of the wheel 75, and thus lock the sleeve 8 and parts connected therewith against further movement. When, however, the lever 22 is raised to cause the reëngagement of the clutch mechanism, the stop-lever 70 will be lifted above the wheel 75 to release said wheel.

In the manufacture of slat-and-wire fabric, particularly when such fabric is designed for use in making the bodies of ventilated barrels, it is highly important to provide means for automatically spacing the finished product or "mat," as it is commonly called, into predetermined lengths, each length comprising the necessary number of slats to form the body of the barrel or like package to be made. The Fisher and Rief patent above mentioned provided dummy mechanism, adapted to automatically form open spaces throughout the length of the finished mat, such spaces indicating the points at which the mat was to be severed into the required lengths. My present invention contemplates improvements in the dummy mechanism or spacing mechanism, and this part of the invention will be next described. As the slats are moved laterally away from the spindles or wire-twisters G G' by the pushers H H' they will pass over a work-table K, (see Fig. 1,) upon the surface of which are placed the adjustable guide-bars $k$, having their inner edges chamfered to receive and guide the ends of the slats, as shown by dotted lines in Fig. 1. Across the work-table K and resting upon the guide-bars $k$ extends the cross-bar K', and to the under side of this bar are attached forwardly-projecting presser-springs $k^2$, beneath which the slats will pass as they are advanced laterally by the pushers H H'. (See Figs. 1 and 18.) Beneath the work-table K extends the cross-bar K$^3$, in which are fixed the rear ends of the rods 80 and 81, the forward ends of these rods being embedded in the feed-table A$^5$. (See Fig. 14.) Adjacent the rods 80 and 81 also extend the rods 82 and 83, that are sustained by the cross-bar K$^3$ and by the feed-table A$^5$. Upon the rods 80 and 81 are mounted the sleeves $m$, to which are pivotally connected the dummies M and M'. Each of the dummies M M' comprises a blade $m'$ and a projecting arm $m^2$, and the dummies M M' are adapted to be rocked about the sleeves $m$ by the depression of the arm $m^2$. When in normal or idle position the dummies M M' rest upon the rods 82 and 83, as shown in Fig. 14. The sleeves $m$, that carry the dummies M M', are free to slide upon the rods 80 and 81; but to these sleeves $m$ are attached depending arms or plates 84, and to these plates is connected a cord 85, that passes over a pulley 86 at the front of the machine, the cord being provided at its front end with a weight 87, (shown by dotted lines in Fig. 1,) that serves to hold the dummies normally adjacent the feed-table A$^5$, as shown in Figs. 14, 15, and 21. Upon a cross-rod N, that extends beneath the work-holding table K (see Figs. 1 and 20) is pivotally mounted a trip-lever P, upon the rear end of which is adjustably mounted a trip arm or finger $p$, which may be set in any required position upon the trip-lever P by means of a set-screw $p'$. A cross-bar N' extends beneath the trip-lever P at the rear of the pivot-rod N. The trip arm or finger $p$ is adapted to bear normally against the under side of the finished mat or fabric as it passes along the work-holding table K and is held into bearing with the under side of the fabric by coiled springs R R', that are connected to the forward part of the trip-lever P (see Figs. 20 and 21) and to the main frame, a coupling R$^2$ being interposed between the springs R R' for adjusting the tension. The purpose of the springs R R' is not only to hold the trip arm or finger $p$ against the under side of the woven mat or fabric, but when the open space that will be formed by the action of the dummy mechanism (as will presently appear) comes above the trip arm or finger $p$, the springs R R' will cause the trip-lever P to rock about the rod N, thereby throwing the trip arm or finger up into the open space of the mat or fabric and cause the forward end of the trip-lever to slightly descend. This downward movement of the forward end of the trip-lever (which movement will be completed by the mechanism presently to be described) will perform two functions, viz: first, it will throw the dummies M M' between the arms or jaws of the wire-twisters, and, second, it will throw the slat-feeding mechanism out of action, so that while the dummies are in such position a slat will not be fed from the hopper. To the forward end of the trip-lever P, which is preferably guided within a vertical slot $a^{12}$ of the feed-table, (see Fig. 21,) is attached a dummy-shifter P', (see Figs. 14 and 15,) that extends above the projecting arms $m^2$ of the dummies M M', so that when the front end of the trip-bar P and dummy-shifter P' are moved downward the dummies M M' will be rocked about the rods 80 and 81 until the blades $m'$ of the dummies pass between the projecting arms $g'$ $g^2$ of the wire-twisters, where they will remain until shortly after the tie-wires are coiled around the binding-wires in front of them. By reference to Figs. 14 and 21 it will be seen that the reduced end $p^3$ of the trip-lever P passes through the slotted end of a lever S, that is pivoted, as at $s$, to the feed-table A$^5$, and to the lower arm of this lever S is connected the inner end of a rod or pitman 50, the outer end of which rod is attached by a bar 49 to the support 45, over which the feed sprocket-chain 42 travels. (See Fig. 17.) It will be understood, of course, that the trip arm or finger $p$ will be set at such position upon the rear end of the trip-lever P as to determine the desired length of the sections into which the finished mat or fabric is to be divided. At the beginning of the operation there will be, of course, no finished mat or fabric upon the work-holding table K, and at such time the trip-lever P will be held in the position shown in Fig. 20 either by hand or by a block temporarily set over its rear end. As soon, however, as the finished mat or fabric has advanced to a point above the trip arm or finger $p$ the rear end of the trip-lever P will be released, allowing the springs R R' to throw the rear end of the lever upward. Mechanism to be presently described will then complete the upward movement of the rear end and downward movement of the front end of the trip-lever P, thereby causing the dummy-shifter P' to strike the arms $m^2$ of the dummies M M' and cause the blades $m'$ of the dummies to pass between the arms or jaws $g'$ $g^2$ of the wire-twisters or spindles. It will be seen also that at the same time the downward movement of the front end of the trip-lever P will rock the lever S about its pivot-point, (see Fig. 14,) thereby causing the rod 50 to move backward the plate 45, (see Fig. 17,) that extends beneath and supports the sprocket-chain 42. Consequently when the dummy mechanism is thus thrown into action the support 45 for the sprocket-chain being depressed allows the feed-dog 43 of this chain to ride beneath the stack of slats Z without feeding one into the machine. As soon, however, as the pushers H H' engage the forward ends of the dummy-blades and advance them laterally with the finished mat or fabric the rear end of the finished mat or fabric will ride along the inclined front face $p^5$ of the trip arm or finger $p$, thereby depressing this trip arm or finger and the rear end of the trip-lever P, so as to restore the trip-lever to the position seen in Fig. 20, and consequently restore the support 45 to the position shown in Fig. 17, so that the feed-dog 43 shall advance the slats Z between the jaws or arms of the wire-twisters or spindles. If the springs R R' be made sufficiently powerful, the movement of the trip-lever P above described may be effected; but a serious objection exists to depending upon the springs R R' for this purpose, viz: If the springs be made sufficiently strong to throw the dummies into action and to throw the slat-feeding mechanism out of action, then the springs cause the trip arm or finger $p$ to bear with too great a pressure upon the under side of the finished mat or fabric. Hence I have provided the mechanism now to be described for effecting the positive throwing of the dummies into action and of the slat-feeding mechanism out of action.

In a suitable bracket or hanger $t$, that is bolted to the main frame at $t'$, (see Fig. 21,) is pivoted a bell-crank lever T. Through the lower end of this lever T passes a stud $t^2$, that projects from a sleeve $t^3$, through which sleeve extends the rod $t^4$, that has its forward end fastened to the cross-rod 59, that unites the upper ends of the pusher-levers at the front of the machine. Upon the lower end of the rod $t^4$ is mounted an adjustable nut or washer $t^5$, between which washer and the sleeve $t^3$ is interposed a coiled spring $t^6$. Hence it will be seen that as the cross-rod 59 is moved back and forth the bell-crank lever T will be turned about its pivot-point, the upper arm of this lever moving upon the curve indicated by the dotted line in Fig. 21. To the forward portion of the trip-lever P is pivoted upon a bolt 90 a pair of depending arms 91, (a single arm having yoke-shaped ends will serve the same purpose,) between the lower ends of which arms is mounted a cross-pin 92, preferably carrying a friction roll or sleeve. To the upper end of one of the arms 91 is pivoted, as at 93, a link 94, the lower end of this link being formed with a long slot 95, through which passes the journal-bolt 96 of the bell-crank lever T. It will be seen that when the forward end of the trip-lever P is given an initial downward movement by the springs R R' the link 94 also moves down, and this downward movement of the link 94 allows the lower ends of the arms 91 to swing slightly toward the bell-crank lever T, so that the pin 92 shall pass into the path of the upper arm of the bell-crank lever. As soon as the upper arm of the bell-crank lever engages the pin 92 it is obvious that the forward end of the trip-lever P will be drawn positively downward, thereby throwing the dummy mechanism into action and throwing the slat-feeding mechanism out of action, in manner hereinbefore described. As soon, however, as the forward end of the trip-lever P is raised again by the depression of its lower end, incident to the passage of the trip arm or finger $p$ beneath the finished mat or fabric, the depending arms 91 will be again brought out of the path of the bell-crank lever T, as shown in Figs. 20 and 21 of the drawings. Upon each side of the trip-lever P is bolted an angular arm 99, and the forward inclined faces of these angular arms are adapted to contact with the bodies of the dummies M M' as the dummies are moved outward or rearward with the finished mat or fabric. Thus by reference to Fig. 14 it will be seen that if the dummies M M' are turned toward each other, so that their blades shall pass between the arms or jaws of the wire twisters or spindles, and if the dummies are then moved laterally with the finished mat or fabric, as the sleeves $m$, by sliding over the rods 80 and 81, will allow, the bodies of the dummies M M' being in approximately vertical position will after several slats have been woven in place contact with the inclined bars 95, and these bars will force the blades $m'$ of the dummies out from between the wires X and $x$ and cause the bodies to drop down onto the bars 82 and 83, as seen in Fig. 14. The weight 87, (see Fig. 1,) exerting its strain on the cord 85 will then pull the dummies M M' back to normal position, (shown in Figs. 1 and 15,) when they will be in readiness to be again thrown into action, as hereinbefore described.

It is manifest that the precise details of construction above set out may be varied within wide limits without departing from the spirit of the invention and that features of the invention may be employed without its adoption as an entirety. Thus, for example, the feature of causing the mechanism that moves the slats laterally from the spindles to gradually advance the slats during the twisting operation may be used regardless of the particular type of spindle mechanism employed. So, also, the feature of throwing the dummy mechanism into action by a positively-moving part of the machine instead of relying solely upon spring mechanism for this purpose may be employed regardless of the particular means employed for twisting the tie-wires.

Having thus described my invention, what I claim as new, and desire to secure by Letters Patent, is—

1. In apparatus of the character described, the combination with one or more revoluble wire-twisting spindles, of mechanism for turning said spindles alternately in opposite directions, comprising two gear-wheels and means for driving them continuously in opposite directions, suitable gearing between said gear-wheels and said spindles, and a clutch for causing said gearing to be driven alternately by said oppositely-moving gear-wheels.

2. In apparatus of the character described, the combination with one or more revoluble wire-twisting spindles, of mechanism for turning said spindles alternately in opposite directions, comprising two gear-wheels and means for driving them continuously in opposite directions, a shaft to which one of said gear-wheels is fixed and upon which the other of said gear-wheels is revolubly mounted, clutch mechanism upon said shaft, means for causing said clutch mechanism to engage either of said gear-wheels, and suitable connecting mechanism between said clutch mechanism and said spindles.

3. In apparatus of the character described, the combination with one or more revoluble wire-twisting spindles, of mechanism for turning said spindles alternately in opposite directions, comprising two gear-wheels and means for driving them continuously in opposite directions, a shaft whereon one of said gear-wheels is fixed, a sleeve mounted on said shaft and whereon said other gear-wheel is loosely mounted, a clutch mechanism connected to said sleeve, suitable gearing connecting said clutch mechanism with said spindles, and suitable means for causing said clutch mechanism to alternately engage said gear-wheels.

4. In apparatus of the character described, the combination with one or more revoluble wire-twisting spindles, of mechanism for turning said spindles alternately in opposite directions, comprising two gear-wheels and means for driving them continuously in opposite directions, a shaft whereon one of said gear-wheels is fixed, a sleeve loosely mounted upon said shaft and having the other gear-wheel revolubly mounted thereon, suitable gearing connecting said sleeve with said spindles, a clutch fixed to said sleeve and arranged intermediate said gear-wheels, and mechanism for causing said clutch to alternately engage said gear-wheels.

5. In apparatus of the character described, the combination with one or more revoluble wire-twisting spindles, of mechanism for turning said spindles alternately in opposite directions, comprising two gear-wheels and means for driving them continuously in opposite directions, clutch-wheels connected to said gear-wheels, a shaft whereon said gear-wheels are mounted, a clutch comprising a pivoted bracket having oppositely-disposed arms adapted to alternately engage the corresponding clutch-wheels, means for causing said clutch to engage either of said gear-wheels, and suitable connecting mechanism between said clutch and said spindles.

6. In apparatus of the character described, the combination with one or more revoluble wire-twisting spindles, of mechanism for turning said spindles alternately in opposite directions, comprising two gear-wheels and means for driving them continuously in opposite directions, clutch-wheels connected with said gear-wheels, a clutch arranged intermediate the gear-wheels and provided with oppositely-disposed arms to engage the respective clutch-wheels, spring mechanism for shifting said arms and latch mechanism for arresting said clutch and holding said arms out of engagement with the clutch-wheels, and suitable connecting mechanism between said clutch and said spindles.

7. In apparatus of the character described, the combination with one or more revoluble wire-twisting spindles, of mechanism for turning said spindles alternately in opposite directions, comprising two gear-wheels and means for driving them continuously in opposite directions, a shaft whereon said gear-wheels are mounted, individual clutch-wheels connected to said gear-wheels, a sleeve mounted upon said shaft and having one of said gear-wheels revolubly mounted thereon, a clutch fixed to said sleeve and located intermediate the gear-wheels, said clutch comprising a projecting arm, a bracket pivotally connected to said arm and having rollers adapted to engage with the individual clutch-wheels, suitable spring mechanism between said clutch-arm and said bracket, a suitable latch for arresting the movement of said clutch-arm and bracket, means for shifting said latch to release the clutch, and suitable connecting mechanism between the clutch and the twisting-spindles.

8. In apparatus of the character described, the combination with one or more revoluble wire-twisting spindles, of mechanism for turning said spindles alternately in opposite directions, comprising two gear-wheels and means for driving them continuously in opposite directions, suitable gearing between said gear-wheels and said spindles, a clutch for causing said gearing to be driven alternately by said oppositely-moving gear-wheels, and a locking device to hold the parts stationary when the clutch is out of action.

9. In apparatus of the character described, the combination with one or more wire-twisting spindles having a central opening or openings through which the main wire or wires will pass and having an eccentric opening or openings through which the tie wire or wires will pass, and pusher mechanism for moving the slats away from said spindles and cam mechanism for operating said pusher mechanism, said cam mechanism being constructed to impart a forward movement to the pusher mechanism while the spindle is at rest and to impart a slight additional forward movement to said pusher mechanism during the revolution of the spindle to prevent the overlapping of the tie wire or wires upon the main wires.

10. In apparatus of the character described, the combination with one or more wire-twisting spindles, of pushers for moving the slats away from said spindles, and cam mechanism for operating said pushers, said cam mechanism being constructed to impart a forward movement to said pushers while the spindle is at rest and to impart a slight additional forward movement to the pusher during the revolution of the spindle.

11. In apparatus of the character described, the combination with one or more revoluble wire-twisting spindles and stationary bearings wherein said spindles are mounted, of mechanism for moving the slats away from said spindles comprising sliding pushers located upon opposite sides of said spindles, a cross-bar connected with said sliding pushers for reciprocating the same, and suitable cam mechanism for imparting a forward-and-backward movement to said cross-bar to actuate said pushers.

12. In apparatus of the character described, the combination with one or more revoluble wire-twisting spindles and stationary bearings wherein said spindles are mounted, of sliding pusher-bars for moving the slats away from said spindles, a cross-bar and adjustable connections uniting said cross-bar to said sliding pusher-bars, and pivoted levers connected to said cross-bar, and cams engaging the lower ends of said pivoted levers.

13. In apparatus of the character described, the combination with revoluble wire-twisting spindles, of a feed-table having cut-away spaces to admit the free ends of said spindles, said feed-table having a bearing-surface between the spindles, and a presser-bar extending over said spindles and over said feed-table.

14. In apparatus of the character described, the combination with one or more revoluble wire-twisting spindles having arms projecting from their ends and with means for revolving said spindles, of mechanism for feeding slats between the arms or jaws of said spindles, mechanism for moving the slats laterally from between said spindle arms or jaws, a dummy and means for moving the same between said spindle arms or jaws, and means for throwing the slat-feed out of action when the dummy is inserted between the spindle-jaws.

15. In apparatus of the character described, the combination with a revoluble wire-twisting spindle having projecting jaws or arms, of a pusher located adjacent said spindle and adapted to move the slats laterally from between the spindle-jaws, and a dummy and means for moving said dummy between the spindle-jaws and into the path of said pusher whereby said dummy will be moved laterally by the pusher from between the jaws of the spindle.

16. In apparatus of the character described, the combination with dummy mechanism for forming the spaces between the mats, of means for throwing said dummy mechanism into action, comprising a part adapted to engage the dummy mechanism, and means whereby said part is actuated by a positively-moving part of the machine.

17. In apparatus of the character described, the combination with dummy mechanism for forming the spaces between the slats, of means for throwing said dummy mechanism into action, comprising a tripper-bar extending beneath the finished mat, and shifter mechanism connected with a positively-moving part of the machine for actuating said tripper-bar.

18. In apparatus of the character described, the combination with dummy mechanism for forming the spaces between the slats, of means for throwing said dummy mechanism into action, comprising a tripper-bar extending beneath the finished mat, and shifter mechanism for actuating said tripper-bar, comprising spring mechanism for imparting an initial movement to said tripper-bar, and mechanism connected with a positively-moving part of the machine for completing the movement of said tripper-bar.

19. In apparatus of the character described, the combination with revoluble wire-twisting spindles, of pushers located at the sides of said spindles and adapted to move the slats in lateral direction, dummies, and means for moving said dummies into the paths of said pushers whereby said dummies will be moved laterally by the pushers.

20. In apparatus of the character described, the combination with dummy mechanism for forming the spaces between the slats, of means for throwing said dummy mechanism into action, comprising a part adapted to engage said dummy mechanism, means whereby said part is shifted to throw the dummy mechanism into action, said means being connected with a positively-moving part of the machine, and means for throwing the slat-feeding mechanism out of action when the dummy mechanism is thrown into action.

21. In apparatus of the character described, the combination with dummy mechanism for forming the spaces between the slats, of means for throwing said dummy mechanism into action, comprising a tripper-bar extending beneath the finished mat, and shifter mechanism comprising a part connected to said tripper-bar and a bell-crank lever adapted to engage said part when the latter is moved into the path of said lever, said bell-crank lever being connected with a positively-moving part of the machine.

22. In apparatus of the character described, the combination with a revoluble wire-twisting spindle and with slat-feeding mechanism for advancing slats across and in front of said spindle, of means for throwing said slat-feeding mechanism out of action comprising a tripper-bar extending beneath the finished mat, and shifter mechanism connected with a positively-moving part of the machine for actuating said tripper-bar.

23. In apparatus of the character described, a wire-twisting spindle having a central aperture for the main wire, and having two forwardly-projecting arms, one of said arms having an aperture concentric with the spindle-aperture for the main wire and the other of said arms having an eye for the binding-wire.

24. In apparatus of the character described, a wire-twisting spindle having a central aperture for the main wire and having two projecting arms, one of said arms having an aperture concentric with the spindle-aperture and having its inner face formed with a guard-rib for the main wire and the other of said arms having an eye at its outer end and having a guide-channel for the tie-wire on its outer face.

25. In apparatus of the character described, a wire-twisting spindle having a central aperture for the main wire, two forwardly-projecting arms, one of said arms having in its end an aperture concentric with said spindle-aperture, and the other of said arms being provided with an aperture for the tie-wire and being somewhat shorter than the arm through which the main wire passes.

JOSEPH REIF, JR.

Witnesses:
 ALBERTA ADAMICK,
 GEO. P. FISHER, JR.